(No Model.)  2 Sheets—Sheet 1.

B. SMITH.
FRICTION CLUTCH.

No. 244,493. Patented July 19, 1881.

Witnesses:

Inventor:
Budd Smith
By his Attys, (No Model.) 2 Sheets—Sheet 2.

B. SMITH.
FRICTION CLUTCH.

No. 244,493. Patented July 19, 1881.

Witnesses:

Inventor:
Budd Smith
By his Attys,

UNITED STATES PATENT OFFICE.

BUDD SMITH, OF SAN FRANCISCO, ASSIGNOR OF ONE-HALF TO FRANK P. BACON, OF OAKLAND, AND WALTON G. HUGHES, OF SAN FRANCISCO, CALIFORNIA.

FRICTION-CLUTCH.

SPECIFICATION forming part of Letters Patent No. 244,493, dated July 19, 1881.

Application filed December 6, 1880. (No model.)

*To all whom it may concern:*

Be it known that I, BUDD SMITH, of the city and county of San Francisco, in the State of California, have invented an Improved Friction-Clutch; and I do hereby declare that the following is a full, clear, and exact description thereof, reference being had to the accompanying drawings.

The object of my invention is to combine in one machine two alternately-acting friction-clutches and their appropriate operating-levers, so that when the compound clutch thus constructed is secured upon a shaft or axle and an alternate reciprocating motion is given to the levers a continuous rotary motion will be imparted to the shaft or axle.

It consists of a wheel or disk, which is provided with a projecting flange or rim on each side near its periphery, and two circular boxes or cases, one on each side of the wheel or disk. The intermediate wheel or disk is permanently secured upon the shaft or axle, while the cases on each side are loose and independent. Each case contains one or more slotted radial dogs or bars, which gripe the rim on the disk, and an operating-lever is attached to each case, so that when the levers are operated alternately up and down the dogs in the cases will alternately gripe the flange on one side and then on the other and impart to the disk and shaft or axle a continuous rotary motion.

My invention also includes an arrangement by which the motion of the disk can be reversed when desired, all as hereinafter more fully described.

Figure 1:
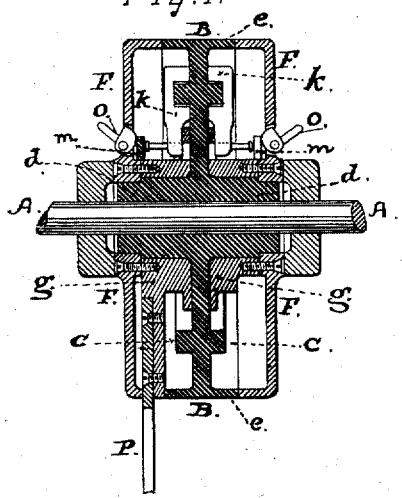
Figure 2:
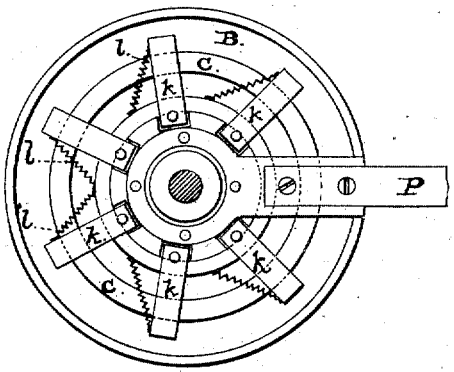
Figure 3:
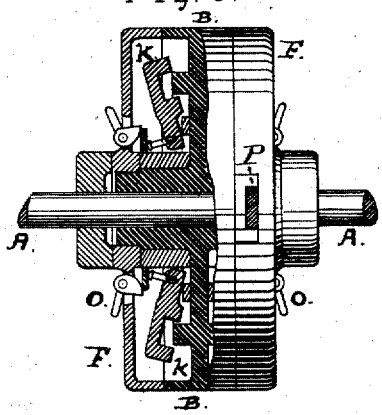
Figure 4:
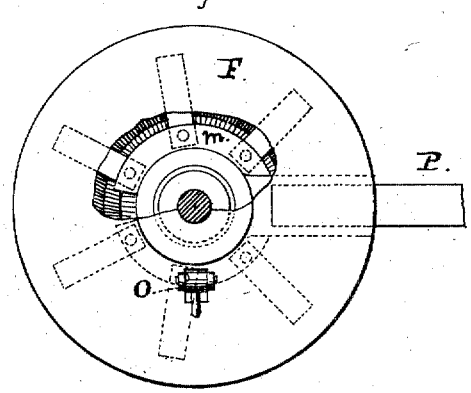
Figure 5:
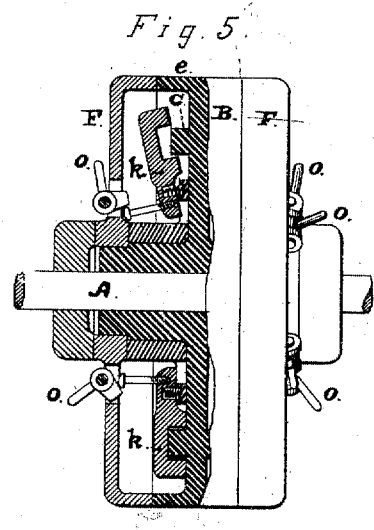
Figure 6:
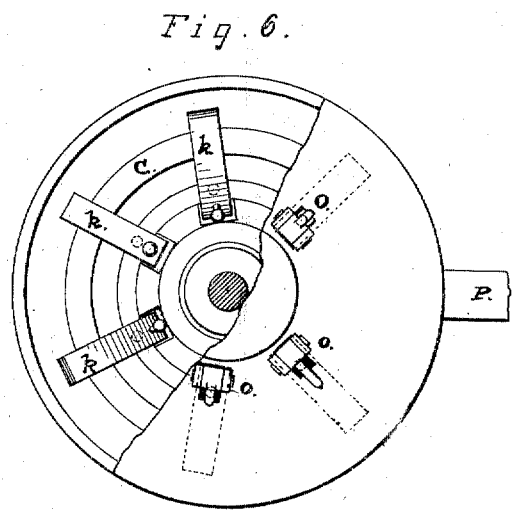
Figure 7:
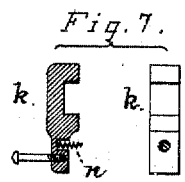

Referring to the accompanying drawings, Figure 1 is a longitudinal section through my improved clutch. Fig. 2 is an inside view of one of the cases removed, but with the clutches and operating-lever in position. Fig. 3 is a view with a portion of the outside casing broken away, and showing a part of the clutches thrown out of action. Fig. 4 is a view taken from the side of Fig. 3. All these views show the arrangement of the clutches or dogs in sets of three. Figs. 5 and 6 show the dogs arranged separately, to be thrown out of action independently of one another. Fig. 7 is a detail of these independent dogs.

Let A A represent a shaft or axle to which it is desired to impart a continuous rotary motion. Upon this axle or shaft I permanently secure, by keys or otherwise, a wheel or disk, B, on each side of which is a projecting flange or rim, $c$, near its periphery. Each flange or rim is continuous, extending entirely around the wheel or disk. This wheel or disk has a long hub, $d$, while its outer edge has a narrow band, $e$, around it. On each side of this wheel or disk I place a loose box or case, F, one side of which is open. Each box or case has a hub, $g$, extending inward, and this hub is large enough in diameter to slip over the hub $d$ of the disk. The open side of each box or case is placed next to the disk, so that the edge of its outer rim will fit against and correspond with the outer rim or band of the disk B, thus forming a single machine of compact and convenient size. In each case F, I place a number of radial bars or dogs, $k$, which extend outward to near the outer rim of the case. The foot of each bar or dog sets in a recess or cavity in the hub $g$ of its case, and a transverse groove is made in each one opposite the flange or rim C on the wheel or disk B, so that it will fit over the flange. A spiral or other spring, $l$, connects the outer end of each dog with the case, so as to cause it to bite or gripe the flange by drawing its upper end in one direction. In the present instance I have represented six dogs in each case, three above the shaft and three below on each side of the disk. The springs $l$ are applied on one side of the dogs above the shaft and on the opposite side of those below the shaft, so that they bite or gripe in opposite directions, thus holding the disk immovable when all the dogs are down. A spring, $n$, is applied behind each dog, so as to thrust its outer end toward the disk and cause its groove to engage with the rim or flange C of the disk. The three lower dogs on each side are connected at their lower ends by a curved bar, $m$, and the three upper dogs on each side are also connected in the same way. A cam, O, is arranged to press each of these bars inward when desired, thus simultaneously disengaging the three dogs with which it is connected from the rim C. An operating-lever, P, is attached to each case F, and these levers are operated alternately in order to drive the disk B and shaft A. In practice I will either connect the outer ends of these two levers by a cord or strap which passes up over a roller, so that a downward pressure on one will lift the other, thus requiring only a downward force to be applied to each lever alternately in order to produce the desired continuous rotary motion, or I will operate it by steam-power by connecting the levers with cranks on an engine-shaft.

In operating this clutch I throw the upper set of dogs on each side out of action by means of the cams O, leaving only the lower set on each side in engagement. I then apply the downward force to the levers alternately, which causes the cases F F to move partially around and back, alternately carrying the disk with them in one direction by the griping of the dogs and releasing it in the opposite direction. This produces the continuous rotary motion. To reverse the motion I disengage the lower set of dogs on each side from the rim C by means of their cams, and throw the upper set of dogs on each side into engagement with it by releasing their cams. As the springs in those of the upper set act in an opposite direction from those in the lower set, the rim C will be griped when the cases move in the opposite direction, thus reversing the motion. The adjustment and action of the dogs, however, can be regulated by the mechanic in constructing the clutch, in order to best adapt it for the work it is to do. This arrangement is shown in Figs. 5 and 6 of drawings, and it provides a compact and convenient clutch which can be used for driving shafts and axles by a simple and direct application of power.

Having thus described my invention, what I claim, and desire to secure by Letters Patent, is—

1. In a reversible friction-clutch, the combination, with the wheel or disk B, having flange or griping-ring C, and the independent cases F, of the griping-dogs $k$, springs $n$, and dogs $o$, arranged to operate substantially as and for the purpose set forth.

2. A reversible friction-clutch consisting of the independent cases F F, having an upper and lower set of dogs which act in opposite directions, each set being connected by a bar, $m$, and arranged to be disconnected from the griping-rim C by a cam, O, or its equivalent, substantially as described.

3. The wheel or disk B, having griping-rims C, and circumferential band $e$, projecting from each face or side of the wheel or disk, and carrying the dogs $k$, in combination with the independent cases F F, carrying the pivoted cams O, and having an inner projecting circumferential rim to fit against the outer edges of the band $e$, to inclose or incase the several parts of the clutch, substantially as and for the purpose specified.

In witness whereof I have hereunto set my hand.

BUDD SMITH.

Attest:
EDWARD E. OSBORN,
WM. F. CLARK.

Corrections in Letters Patent No. 244,493.

It is hereby certified that Letters Patent No. 244,493, issued July 19, 1881, for an improvement in "Friction Clutches," upon the application of Budd Smith, were improperly granted to said Budd Smith as the owner of one-half interest therein; whereas it appears by assignments upon record in this Office, (Liber E 26, page 109, and I 26, page 228,) that said Smith had assigned his entire interest to Frank P. Bacon and Walton G. Hughes, and that the said Letters Patent should have been granted to said Frank P. Bacon and Walton G. Hughes; that the proper corrections have been made in the files and papers relating to the case in the Patent Office, and are hereby made in said Letters Patent, to make the title therein conform to the records of the Patent Office.

Signed, countersigned, and sealed this 11th day of October, A. D. 1881.

[SEAL.]
A. BELL,
*Acting Secretary of the Interior.*

Countersigned:

E. M. MARBLE,
*Commissioner of Patents.*